United States Patent [19]
Tajima

[11] 3,848,969
[45] Nov. 19, 1974

[54] SHORT PHYSICAL LENGTH ZOOM LENS
[75] Inventor: Akira Tajima, Kawasaki, Japan
[73] Assignee: Canon Kabushiki Kaisha, Tokyo, Japan
[22] Filed: Apr. 5, 1973
[21] Appl. No.: 348,070

[30] Foreign Application Priority Data
Apr. 18, 1972 Japan.............................. 47-38980

[52] U.S. Cl.................. 350/184, 350/176, 350/214
[51] Int. Cl. ............................................. G02b 15/16
[58] Field of Search............................. 350/184, 186

[56] References Cited
UNITED STATES PATENTS
3,143,590  8/1964  Higuchi.............................. 350/184

Primary Examiner—John K. Corbin
Attorney, Agent, or Firm—Toren, McGeady and Stanger

[57] ABSTRACT

A zoom lens system consisting of, in the order of the entrant light beam, a front movable lens group having a negative focal length and a rear movable lens group having a positive focal length which are mechanically moved, said front lens group comprising, in combination, at least two positive lens members and negative lens members, said rear lens group comprising positive and negative lens members of which the positive lens member nearest to the object comprises at least two positive lens elements, and said zoom lens system satisfying certain conditions related to one another among the focal length $F_1$ of the front lens group, the air space $l_w$ between the front and rear lens groups positioned at the shortest focal length range of the entire lens system, the focal length $f_2$ of the rear lens group, the focal length $f_3$ of a refractive surface of the negative lens member in the rear lens group, said surface facing the image plane and having a strong negative power, and the focal length $f_4$ of the rearmost positive lens member.

4 Claims, 5 Drawing Figures

A SHORT PHYSICAL LENGTH ZOOM LENS

This invention relates to a zoom lens system including a wide angle of field and consisting of two lens groups of which the front lens group has a negative focal length and the rear lens group has a positive focal length, and more particularly to a zoom lens system which is adapted for use with still cameras by minimization of the size of the lens system along its optical axis, balancing residual aberrations in extremely small magnitudes, and employment of a mechanism of mechanical compensation type which permits the focal plane to remain axially stationary during the zooming, and which has also its use with cinematographic cameras or stationary television transmitting cameras as well.

Zoom lens objectives of the type consisting of two lens groups of which the front lens group has a negative focal length and the rear lens group has a positive focal length are well known. These zoom lens objectives so constructed are of the inverted telephoto type which has an advantage of providing the lens objectives with increased angular field, and the diaphragm of the objective is located within the air space of the rear lens group, so that the variation of residual distortion can be made relatively small when zooming from the shortest to the longest focal length range of the objective, but residual spherical aberration and coma aberration vary largely. Particularly the residual spherical aberration in the long focal length positions cannot be compensated without a large difficulty on account of the type of the lens configuration, and the difficulty in turn brings about a large difficulty in increasing the relative aperture of the objective. These defects are intensified as the powers of the front and rear lens groups are increased to shorten the entire axial length of the lens system. Therefore, the minimization of the size of the lens system has so far been incompatible with the formation of images of a constant high quality throughout the entire focal length region.

According to this invention, the above-mentioned defects are overcome, and the previously mentioned object is realized by the use of a characteristic form, construction and arrangement of the lens elements which constitute the lens system with extremely small quantities of residual aberrations, thereby the variation of the residual aberrations is made extremely small while still minimizing the size of the lens system along its optical axis. On the other hand, the lens system is so constructed as to have a back focus so long that it can be used with single lens reflex cameras, satisfying the following characteristics and conditions.

The present invention will be described referring to the attached drawings.

Figure 1:
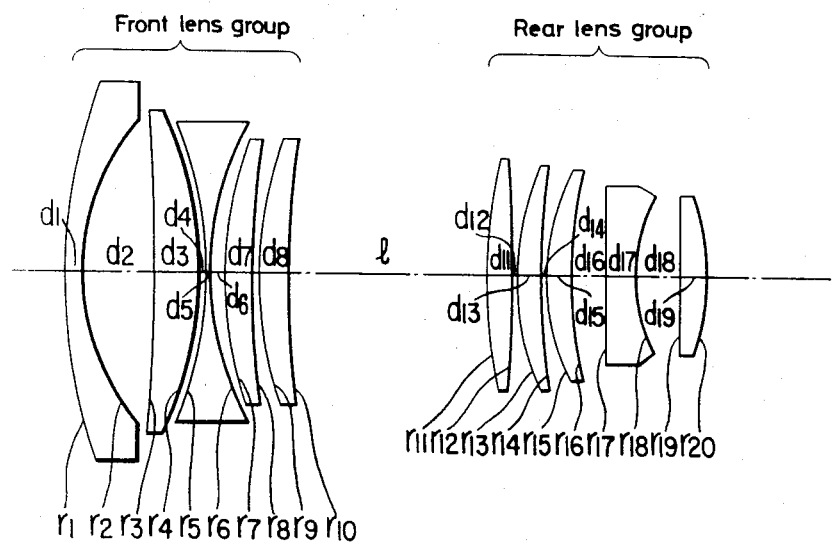
FIG. 1 is a diagrammatic view of one embodiment of the zoom lens system of this invention.
Figure 2:
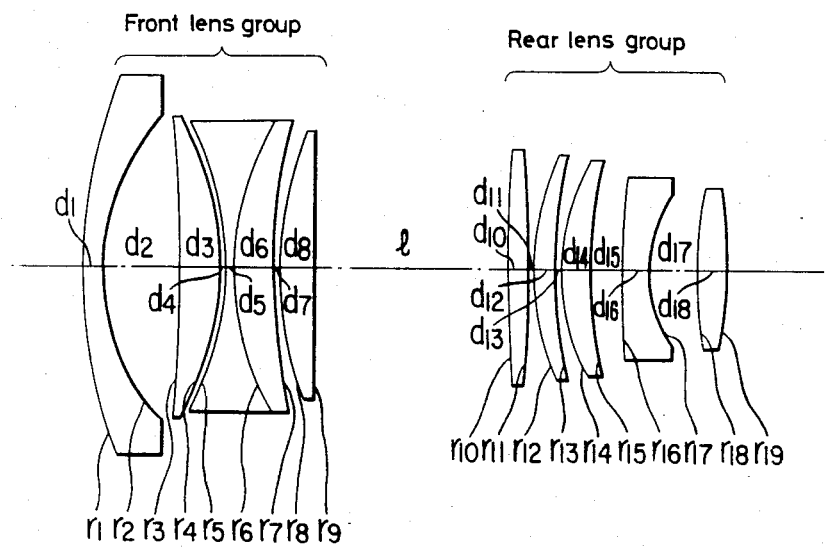
FIG. 2 is a diagrammatic view of another embodiment of the zoom lens system of this invention.
Figure 3A:
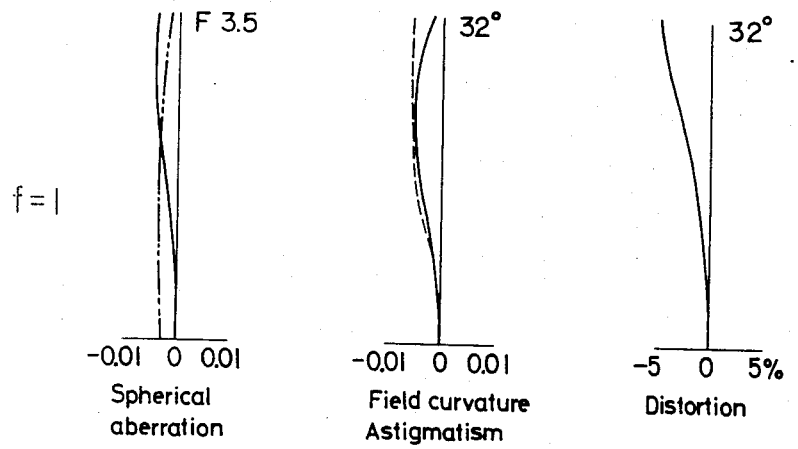
FIGS. 3a, 3b and 3c are aberration curves of the zoom lens system (the first embodiment) of this invention at the shortest, intermediate and longest focal length positions respectively.
Figure 3B:
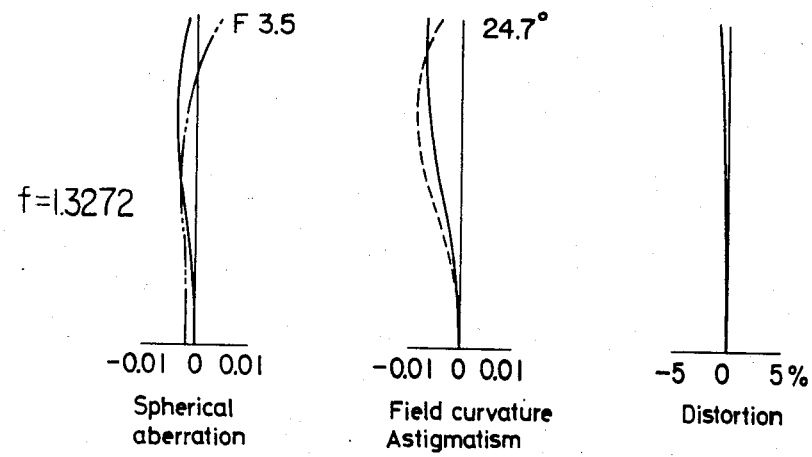
Figure 3C:
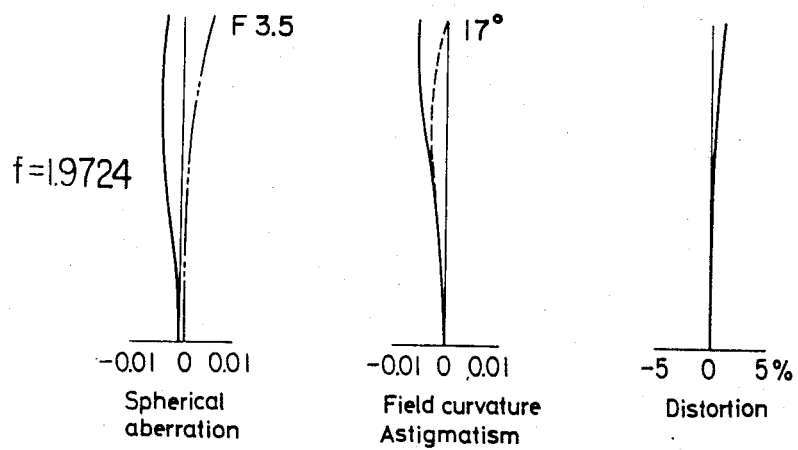

The lens system of this invention consists of two groups of lens elements arranged in such a manner that, with respect to incident light, a front lens group comprising, in combination, a plurality of positive lens elements and a plurality of negative lens elements has a negative focal length as a whole, and rear lens group comprising, in combination, a plurality of positive lens elements and a negative lens element has a positive focal length as a whole. To effect a continuous change in the equivalent focal length of the system, the front and rear lens groups are axially moved mechanically while maintaining a fixed focal plane throughout the entire focal length range.

In a zoom lens of the type described, as the power of the front lens group is strengthened, the back focus is increased and at the same time the zooming movement of the lens groups is decreased, but such advantages entail a disadvantage of creating a difficult problem in compensating residual aberrations. If the power of the front lens group is weakened to increase the air space between the front and rear lens groups, residual aberrations will be advantageously compensated, but the size of the lens system along its optical axis will objectionably increase. According to this invention, however, the above-mentioned defects are overcome both by so constructing the front lens group in a special form as comprising at least two positive lens members and at least two negative lens members, and by defining the restrictive limitations for each of the equivalent focal length $f_1$ of the front group and air space $l_w$ between the front and rear lens groups at the shortest focal length position. Now letting the shortest focal length be $f_w$, we may define the restrictive limitations as follows.

$$-2.4 < f_1/f_w < -1.55 \tag{1}$$

$$1.1 < l_w/f_w < 1.75 \tag{2}$$

The upper limit of (1) is set forth to prevent the negative power of the front group from becoming too large. When the upper limit is violated, a good compensation for distortion is difficult to accomplish, and the back focus is increased too long. When the lower limit is violated, there arise such disadvantages that the entire axial length of the lens system is increased, the back focus is shortened, and the zooming movement is increased, although it is advantageous in correcting for aberrations.

In condition (2), when the upper limit is violated, a good compensation for residual aberrations is effected, but the back focus and the total length of the lens system are increased too long, while when the lower limit is violated, the zooming movement is decreased with decrease in the zoom ratio.

The rear lens group consists of three lens members arranged in such a manner that, with respect to the incident light, the first member has a positive power, the second member has a negative power, and the third member has a positive power, said first lens member being comprised of at least two positive lens elements so as to remove the variation and deterioration of spherical aberration which are caused when zooming from the shortest to the longest focal length range. The second negative lens member is characterized as having a refractive curvature having a strong negative power and facing the image plane, thereby the focal length of said surface designated by $f_3$ related to the overall focal length of the rear lens group designated by $f_2$ satisfying the condition $$-0.65 < f_3/f_2 < -0.38 \quad (3)$$

When the upper limit is violated, a good compensation for barrel distortion is effected, but a remarkable variation of residual spherical aberration results when zooming, which is difficult to compensate. When the lower limit is violated, the barrel distortion cannot be compensated sufficiently, and an undercorrection for compensation of residual spherical aberration and field curvature results.

The rearmost positive lens member is particularly effective for compensation of on-axis and off-axis residual spherical aberrations, and its focal length should satisfy the following unequation $$1.0 < f_4/f_2 < 1.95 \quad (4)$$

When the upper limit of (4) is violated, residual spherical aberrations are increased too large. When the lower limit is violated, a good compensation for residual distortion and field curvature cannot be accomplished without difficulty.

As for the correction for chromatic aberration, each of the front and rear lens groups should be corrected for chromatic aberration in order to effect a small chromatic aberration variation which is caused by the zooming movement. In the front lens group, selection of the Abbe number of at least one lens member at less than 35 is effective for minimizing the variation of residual on-axis chromatic aberration and correcting the lateral chromatic aberration. When this value is exceeded, the on-axis chromatic aberration of g line with respect to that of d line is too much under-corrected at the short focal length positions, and too much over-corrected at the long focal length positions, and at the same time the lateral chromatic aberration is under-corrected. In the rear lens group, selection of the Abbe number of the negative lens member at less than 35 is effective for the removal of chromatic aberration. An excess over this value results in under-correction for on-axis chromatic aberration as well as lateral chromatic aberration, which cannot be compensated in the rest lens elements without difficulty.

Constructional data for two embodiments of the zoom lens system of this invention are given in the following.

Example 1

| | $f$ | $l$ | Back focus |
|---|---|---|---|
| F 1 : 3.5 | 1.0 | 1.3222 | 1.1418 |
| Angle of field: 65° - 34° | 1.3272 | 0.6814 | 1.3565 |
| | 1.9724 | 0.0406 | 1.7799 |

| No. | R | D | $N_a$ | $V_a$ |
|---|---|---|---|---|
| 1 | 2.2280 | 0.0648 | 1.74077 | 27.8 |
| 2 | 0.8603 | 0.2701 | | |
| 3 | −10.1706 | 0.1538 | 1.61293 | 37.0 |
| 4 | −0.3811 | 0.0056 | | |
| 5 | −1.5017 | 0.0423 | 1.713 | 54.0 |
| 6 | 1.0803 | 0.0390 | | |
| 7 | 1.1947 | 0.1294 | 1.71736 | 29.5 |
| 8 | 4.2054 | 0.0028 | | |
| 9 | 1.4206 | 0.1236 | 1.58144 | 40.7 |
| 10 | 5.0476 | ($l$) | | |
| 11 | 2.2331 | 0.0817 | 1.6968 | 55.7 |
| 12 | −8.3296 | 0.0028 | | |
| 13 | 0.9935 | 0.1010 | 1.62041 | 60.3 |
| 14 | 3.1062 | 0.0028 | | |

Example 1-Continued

| | $f$ | $l$ | Back focus |
|---|---|---|---|
| F 1 : 3.5 | 1.0 | 1.3222 | 1.1418 |
| Angle of field: 65° - 34° | 1.3272 | 0.6814 | 1.3565 |
| | 1.9724 | 0.0406 | 1.7799 |

| No. | R | D | $N_a$ | $V_a$ |
|---|---|---|---|---|
| 15 | 0.7713 | 0.1063 | 1.60311 | 60.7 |
| 16 | 2.1228 | 0.1226 | | |
| 17 | 11.3901 | 0.1025 | 1.80518 | 25.4 |
| 18 | 0.5528 | 0.1761 | | |
| 19 | −227.281 | 0.0986 | 1.70154 | 41.1 |
| 20 | −1.2749 | | | |

Example 2

| | $f$ | $l$ | Back focus |
|---|---|---|---|
| F 1 : 3.5 | 1 | 1.2999 | 1.1799 |
| Angle of field: 65° - 34° | 1.3272 | 0.6591 | 1.3946 |
| | 1.9724 | 0.0183 | 1.8181 |

| No. | R | D | $N_a$ | $V_a$ |
|---|---|---|---|---|
| 1 | 2.0439 | 0.0648 | 1.74077 | 27.8 |
| 2 | 0.7975 | 0.2875 | | |
| 3 | −11.5886 | 0.1657 | 1.61293 | 37.0 |
| 4 | −1.1526 | 0.0056 | | |
| 5 | −1.2061 | 0.0423 | 1.713 | 54.0 |
| 6 | 1.0447 | 0.1649 | 1.71736 | 29.5 |
| 7 | 2.7812 | 0.0028 | | |
| 8 | 1.3459 | 0.1294 | 1.58144 | 40.7 |
| 9 | 16.3644 | $l$ | | |
| 10 | 4.5543 | 0.0816 | 1.69680 | 55.7 |
| 11 | −5.6236 | 0.0028 | | |
| 12 | 0.8306 | 0.1082 | 1.62041 | 60.3 |
| 13 | 2.9095 | 0.0028 | | |
| 14 | 0.7545 | 0.1118 | 1.60311 | 60.7 |
| 15 | 1.7120 | 0.1286 | | |
| 16 | 6.4439 | 0.1025 | 1.80518 | 25.4 |
| 17 | 0.5206 | 0.1830 | | |
| 18 | 2.3344 | 0.1041 | 1.70154 | 41.1 |
| 19 | −2.0516 | | | |

What is claimed is:

1. A short physical length optical objective of the zoom type comprising, in the direction of an incident light beam, a front lens group of negative power and a rear lens group of positive power axially separated from each other by a variable air space to effect magnification variation, said front group including, in succession in said direction, a negative meniscus lens element having a convex forward surface, a positive lens element having a strongly convex rear surface, a double concave lens element, and two positive meniscus lens elements each having a convex forward surface, said rear lens group comprising a plurality of mutually spaced lenses including, in succession in said direction, two positive meniscus lens elements each having a convex forward surface, a negative lens element having a concave rear surface, and a positive lens element.

2. The objective as defined in claim 1, in which the characteristics of the lenses of the front and rear lens groups are defined by the following tables:

| | $f$ | $l$ | Back focus |
|---|---|---|---|
| F 1 : 3.5 | 1.0 | 1.3222 | 1.1418 |
| Angle of field: 65° - 34° | 1.3272 | 0.6814 | 1.3565 |
| | 1.9724 | 0.0406 | 1.7799 |

| Lens Group | | Radius of Curvature | Lens Thickness and Air Space | Index of Refraction | Abbe Number |
|---|---|---|---|---|---|
| Front | $r_1 =$ | 2.2280 | $d_1 = 0.0648$ | 1.74077 | 27.8 |
| | $r_2 =$ | 0.8603 | $d_2 = 0.2701$ | | |
| | $r_3 =$ | −10.1706 | $d_3 = 0.1538$ | 1.61293 | 37.0 |
| | $r_4 =$ | − 0.3811 | $d_4 = 0.0056$ | | |
| | $r_5 =$ | − 1.5017 | $d_5 = 0.0423$ | 1.713 | 54.0 |
| | $r_6 =$ | 1.0803 | $d_6 = 0.0390$ | | |
| | $r_7 =$ | 1.1947 | $d_7 = 0.1294$ | 1.71736 | 29.5 |
| | $r_8 =$ | 4.2054 | $d_8 = 0.0028$ | | |
| | $r_9 =$ | 1.4206 | $d_9 = 0.1236$ | 1.58144 | 40.7 |
| | $r_{10} =$ | 5.0476 | $l$ | | |
| Rear | $r_{11} =$ | 2.2331 | $d_{11} = 0.0817$ | 1.6968 | 55.7 |
| | $r_{12} =$ | −8.3296 | $d_{12} = 0.0028$ | | |
| | $r_{13} =$ | 0.9935 | $d_{13} = 0.1010$ | 1.62041 | 60.3 |
| | $r_{14} =$ | 3.1062 | $d_{14} = 0.0028$ | | |
| | $r_{15} =$ | 0.7713 | $d_{15} = 0.1063$ | 1.60311 | 60.7 |
| | $r_{16} =$ | 2.1228 | $d_{16} = 0.1226$ | | |
| | $r_{17} =$ | 11.3901 | $d_{17} = 0.1025$ | 1.80518 | 25.4 |
| | $r_{18} =$ | 0.5528 | $d_{18} = 0.1761$ | | |
| | $r_{19} =$ | −227.281 | $d_{19} = 0.0986$ | 1.70154 | 41.1 |
| | $r_{20} =$ | −1.2749 | | | | where $r$ subscripts denote the radii of curvature of the respective lenses, $d$ subscripts denote the axial distances between successive surfaces of the lenses, and the refractive indices are measured at the d-line of the spectrum of the glasses of the respective lenses.

3. An objective as defined in claim 1, in which said double lens element and the next succeeding position meniscus lens element in the front group are cemented together to form a doublet lens member.

4. An objective as defined in claim 3, in which the characteristics of the lenses of the front and rear lens groups are defined by the following tables:

| | $f$ | $l$ | Back focus |
|---|---|---|---|
| F 1 : 3.5 | 1 | 1.2999 | 1.1799 |
| Angle of field: 65°− 34° | 1.3272 | 0.6591 | 1.3946 |
| | 1.9724 | 0.0183 | 1.8181 |

| Lens Group | | Radius of Curvature | Lens Thickness and Air Space | Index of Refraction | Abbe Number |
|---|---|---|---|---|---|
| Front | $r_1 =$ | 2.0439 | $d_1 = 0.0648$ | 1.74077 | 27.8 |
| | $r_2 =$ | 0.7975 | $d_2 = 0.2875$ | | |
| | $r_3 =$ | −11.5886 | $d_3 = 0.1657$ | 1.61293 | 37.0 |
| | $r_4 =$ | −1.1526 | $d_4 = 0.0056$ | | |
| | $r_5 =$ | 1.2061 | $d_5 = 0.0423$ | 1.713 | 54.0 |
| | $r_6 =$ | 1.0447 | $d_6 = 0.1649$ | | |
| | $r_7 =$ | 2.7812 | $d_7 = 0.0028$ | 1.71736 | 29.5 |
| | $r_8 =$ | 1.3459 | $d_8 = 0.1294$ | 1.58144 | 40.7 |
| | $r_9 =$ | 16.3644 | $l$ | | |
| Rear | $r_{10} =$ | 4.5543 | $d_{10} = 0.0816$ | 1.69680 | 55.7 |
| | $r_{11} =$ | −5.6236 | $d_{11} = 0.0028$ | | |
| | $r_{12} =$ | 0.8306 | $d_{12} = 0.1082$ | 1.62041 | 60.3 |
| | $r_{13} =$ | 2.9095 | $d_{13} = 0.0028$ | | |
| | $r_{14} =$ | 0.7545 | $d_{14} = 0.1118$ | 1.60311 | 60.7 |
| | $r_{15} =$ | 1.7120 | $d_{15} = 0.1286$ | | |
| | $r_{16} =$ | 6.4439 | $d_{16} = 0.1025$ | 1.80518 | 25.4 |
| | $r_{17} =$ | 0.5206 | $d_{17} = 0.1830$ | | |
| | $r_{18} =$ | 2.3344 | $d_{18} = 0.1041$ | 1.70154 | 41.1 |
| | $r_{19} =$ | −2.0516 | | | | where $r$ subscripts denote the radii of curvature of the respective lenses, $d$ subscripts denote the axial distances between successive surfaces of the lenses and the refractive indices are measured at the $d$-line of the spectrum of the glasses of the respective lenses.

* * * * *